Figure 1:
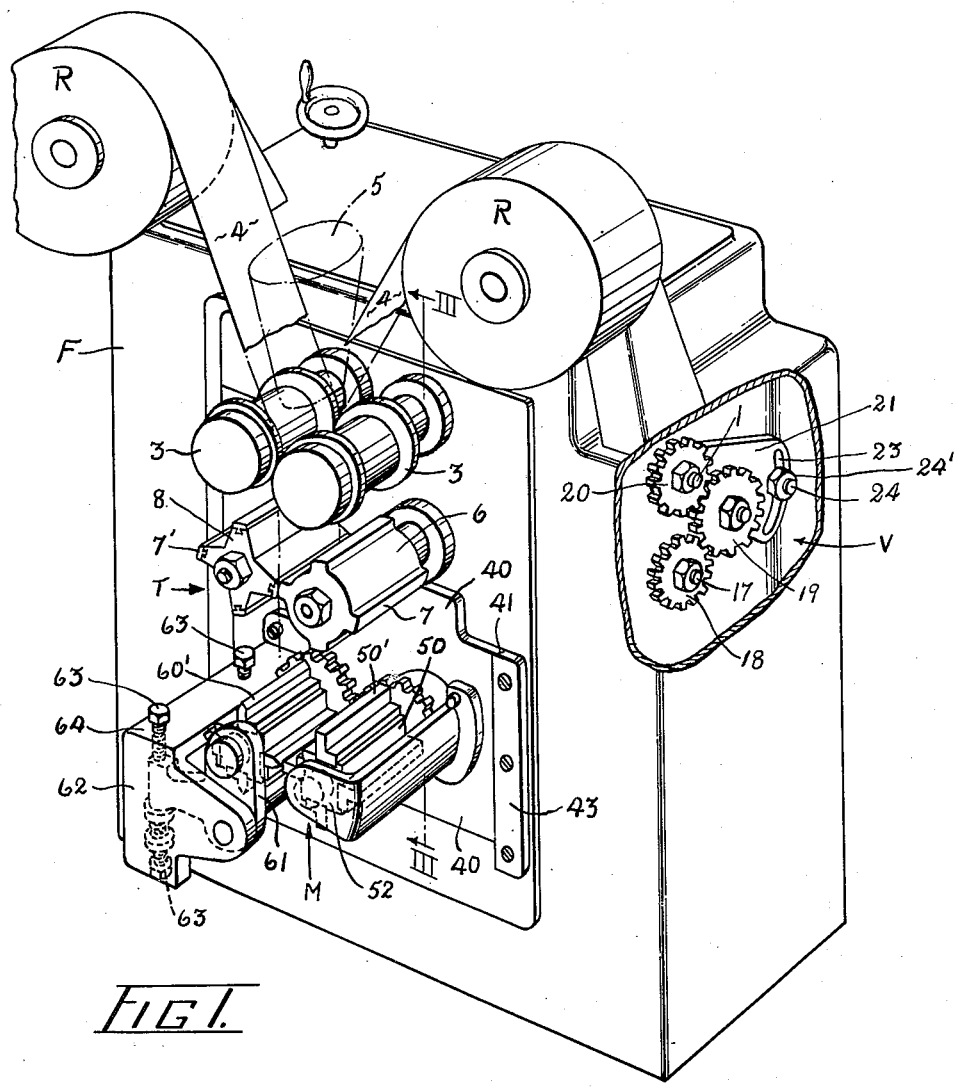

Sept. 23, 1952 V. G. WILLIAMS 2,611,225
MACHINERY FOR FABRICATING BAGS IN VARIOUS SIZES
Filed Dec. 30, 1948 5 Sheets-Sheet 1

FIG. I.

INVENTOR.
V. G. WILLIAMS
BY
Leon Arthurs
ATTORNEY.

INVENTOR.
V. G. WILLIAMS
BY
Leon Arthurs
ATTORNEY

Sept. 23, 1952     V. G. WILLIAMS     2,611,225
MACHINERY FOR FABRICATING BAGS IN VARIOUS SIZES
Filed Dec. 30, 1948     5 Sheets-Sheet 3

INVENTOR.
V. G. WILLIAMS.
BY
Leon Arthurs
ATTORNEY.

Sept. 23, 1952 V. G. WILLIAMS 2,611,225
MACHINERY FOR FABRICATING BAGS IN VARIOUS SIZES
Filed Dec. 30, 1948 5 Sheets-Sheet 4
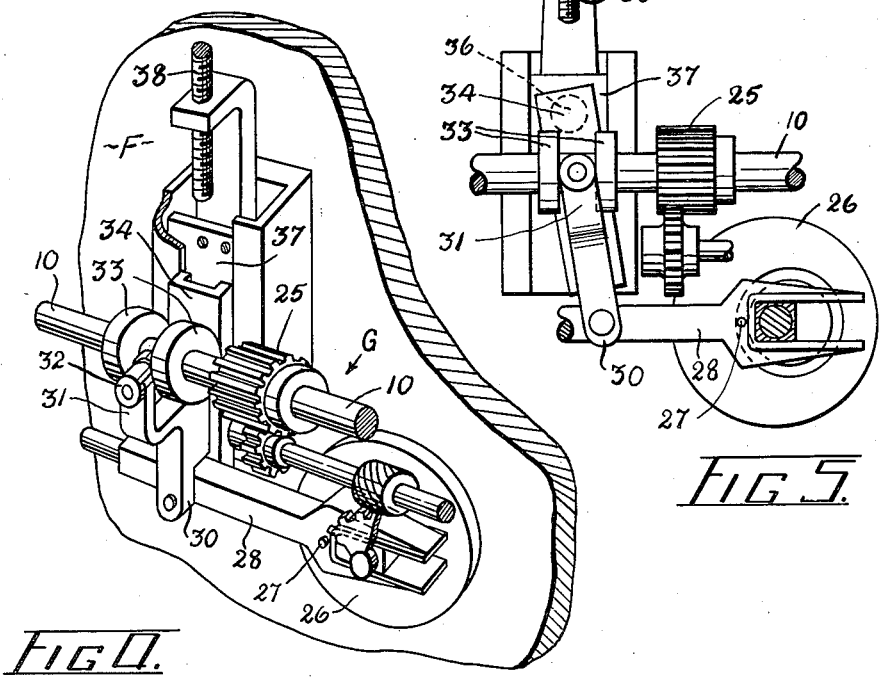
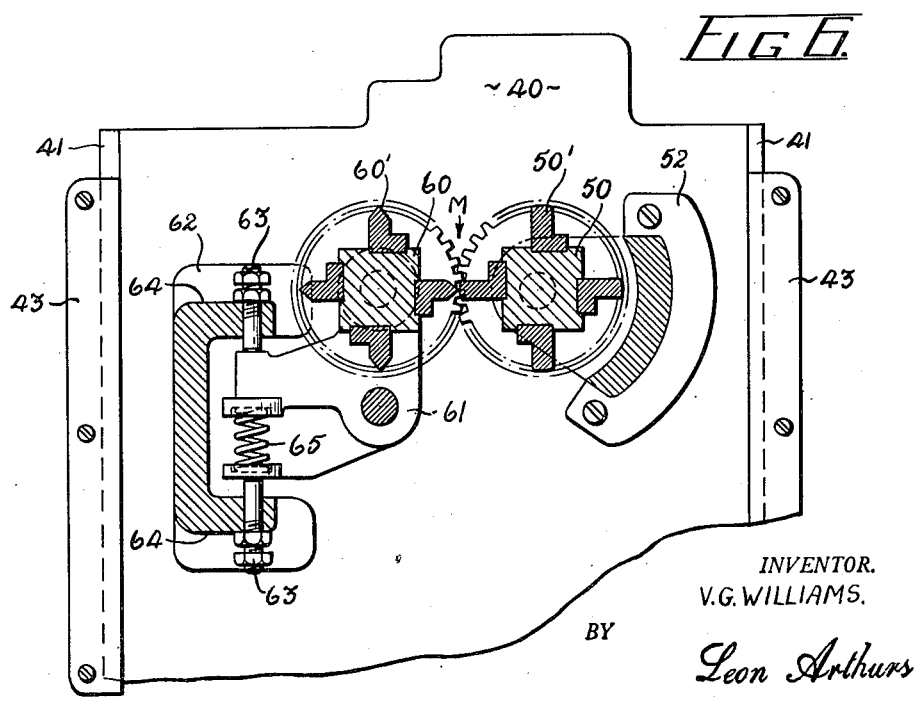
INVENTOR.
V. G. WILLIAMS.
BY
Leon Arthurs
ATTORNEY Sept. 23, 1952 V. G. WILLIAMS 2,611,225
MACHINERY FOR FABRICATING BAGS IN VARIOUS SIZES
Filed Dec. 30, 1948 5 Sheets-Sheet 5

INVENTOR.
V. G. WILLIAMS.
BY
Leon Arthurs
ATTORNEY.

Patented Sept. 23, 1952

2,611,225

UNITED STATES PATENT OFFICE 2,611,225

MACHINERY FOR FABRICATING BAGS IN VARIOUS SIZES

Victor George Williams, Toronto, Ontario, Canada, assignor, by mesne assignments, to Delamere & Williams Company, Limited, Toronto, Ontario, Canada Application December 30, 1948, Serial No. 68,303

4 Claims. (Cl. 53—88)

The instant invention relates to new and useful improvements in packaging machinery adapted to form packets or bags of various commodities such as, for example, tea, coffee and/or the like and to the processes used therein.

Machinery of this type, adapted to form ribbons or webs of bag material into bags, is generally divisible into two broad categories, namely: that wherein the bag material is operated upon continuously and that wherein it is operated upon intermittently; the former, commonly regarded as the more efficient of the two, being selected for exemplary purposes herein.

In the continuous duty machine one or more ribbons of bag material are continuously drawn in tubular conformation between elements which weld or seal together the registering longitudinal edges thereof. From there the resultant tube is fed past a rotary transverse sealing element which, as its name implies, is adapted to apply thereto successive transverse seals which join together the walls thereof and thereby define a series of connected bags. These, in turn, travel through a cutting mechanism which splits the transverse seals thus separating the bags; they having been previously charged with a commodity at a suitable stage in the foregoing process.

Prior apparatuses of this nature were mainly designed to produce only one size of bag, and were not capable of producing any other size without extensive overhaul and rebuilding. Since different commodities often require to be put up in different quantities, and for other reasons, the inability of the previous machines to fabricate bags in more than one given capacity constituted a major disadvantage. The broad object of the invention is, therefore, to enhance the versatility of the packaging art by providing a machine with simply adjustable means for enabling it selectively to make bags in a relatively large variety of sizes.

Although the capacity of the bags under consideration is a product of the width of the ribbon material used therein and of the spacing between transverse seals, the invention is chiefly concerned with the latter factor and hence contemplates as another of its objectives the provision of bag producing machinery capable of so sealing the bag material at predetermined and readily variable intervals. Since the bag material, as herein visualized, is in constant motion, the effect of varying the sealing intervals as aforesaid is to vary correspondingly the spacing between successive seals. However, in further view of this constant motion, the transverse sealing element is not only required to travel with the bag material while acting thereon, but is also required to travel at a commensurate speed in order to avoid unequal and possibly harmful stresses thereon. Hence, it is also an important object of the invention to provide the bag fabricating machinery described with regulable mechanism for controlling the action of the transverse sealing element to permit the passage of a predetermined length of bag material before operating thereon and to operate thereon at a proper speed.

It is an additional object of the invention to provide the regulable machinery described with bag separating mechanism which is adjustable according to the inter-seal spacing.

The design of the apparatus intended to serve the aforesaid purposes is based on a novel process which also constitutes one of the objects of the invention.

The means whereby the foregoing and other hitherto unstated objects of the invention are realized will be apparent from the hereinafter following description of the elements, parts, and principles which constitute the invention, whereof a selected embodiment is illustrated, by way of example only, in the annexed drawings wherein:

Fig. 1 is a top front perspective of the instant machine with broken out portions and dotted lines revealing hidden details thereof.

Figure 2:
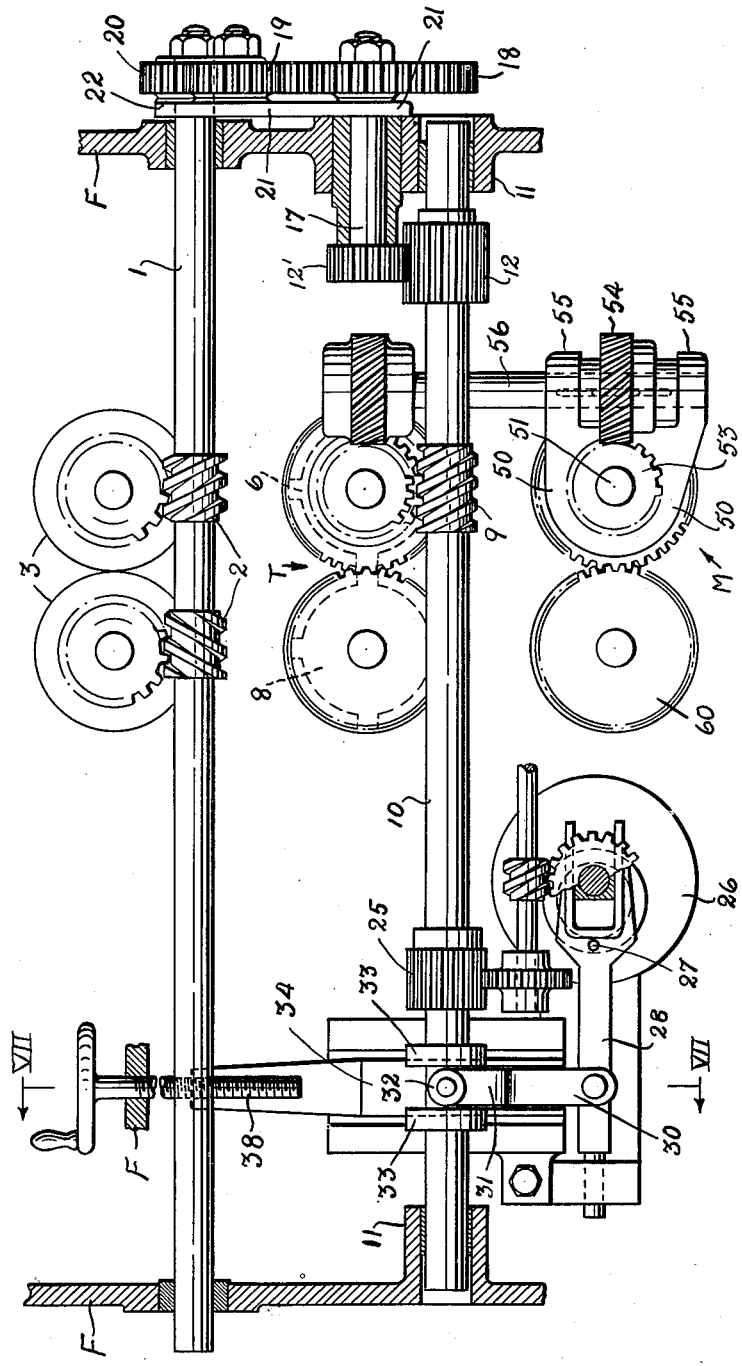

Fig. 2 a diagrammatic view of some of the main working parts.

Figure 3:
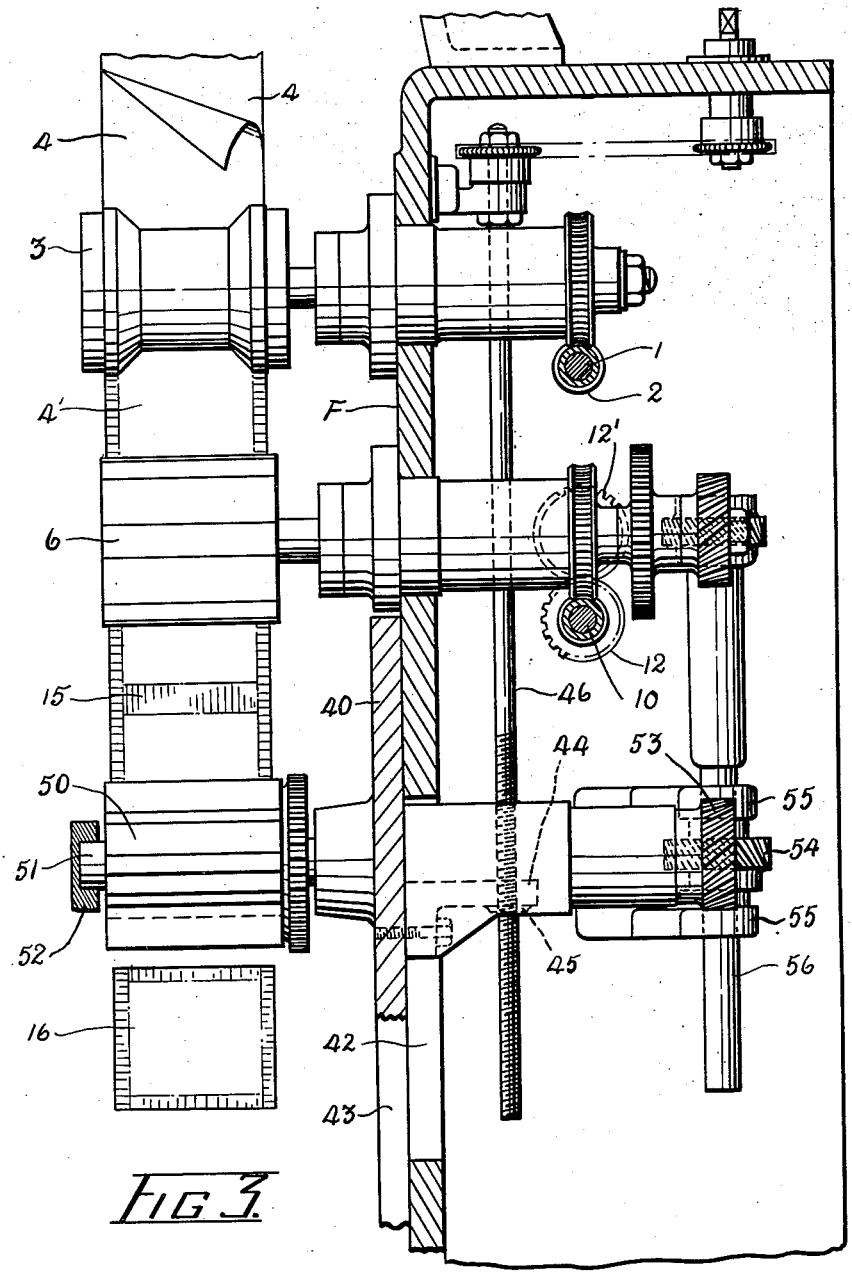

Fig. 3 a section along the line III—III in Fig. 1 to which has been added bag material and a completed bag to illustrate the various operations.

Fig. 4 a perspective view of a portion of the mechanism shown in Fig. 2.

Fig. 5 an elevational view of the device of Fig. 4 at a different stage in the operation thereof.

Fig. 6 a front elevation, partly in section of the mechanism for separating the bags.

Figure 7:
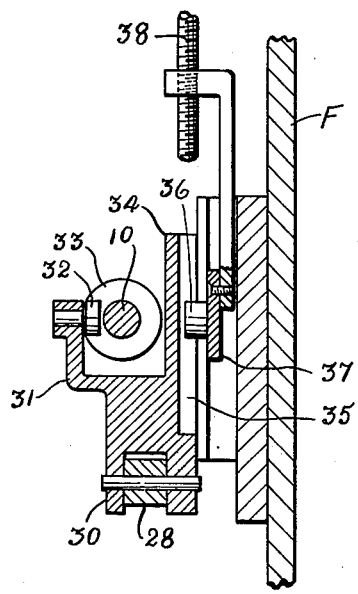

Fig. 7 a section along the line VII—VII in Fig. 2 through the mechanism of Figs. 4 and 5.

Figure 8:
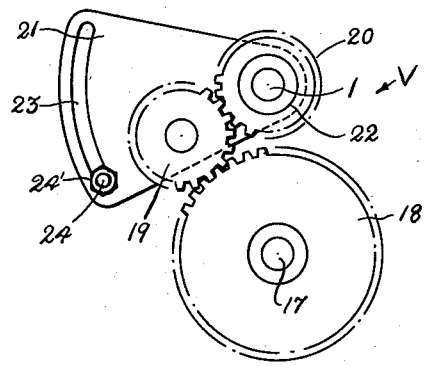
Figure 9:
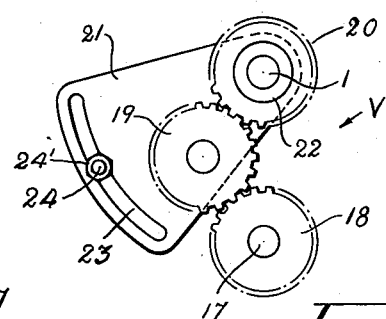
Figure 10:
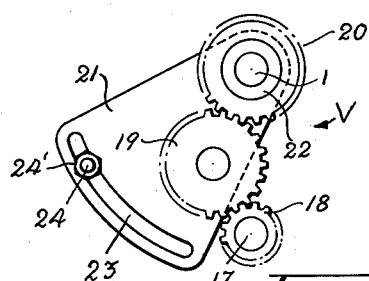

Figs. 8, 9 and 10 plans views of a variable speed transmission unit contemplated by the invention.

Like reference numerals refer to like parts of the invention throughout the several views.

The structure of the instant invention is mounted on and housed in the frame F shown in Fig. 1 in the form of a cabinet with a front, a top, and left and right walls. Sustained in conventional bearings therein is a horizontal driven shaft 1 which projects through a wall thereof and on which are mounted right and left hand worms 2—2 adapted to drive a pair of contacting feed rollers 3—3 through suitable media. The media referred to or implied in this and subsequent instances include conventional arbors and gears. These being in any case well known in the art, it has been deemed best to omit the particulars thereof since their inclusion herein would serve only to complicate and unduly lengthen the hereinafter following disclosure. As is also well known, the feed rollers 3—3 are generally spool shaped with widened and heated end flanges between which ribbons 4—4 of thermoplastic or like bag material are drawn and fed and by which they are welded together into the tubular structure 4'. The spool shape of these elements serves to permit a material filling spout 5 to be disposed intermediately thereof in a conventional manner as shown by the broken lines in Fig. 1. However, it should be pointed out that the means for filling the bag to be described does not constitute part of the invention and hence need not be described with any degree of particularity.

The transverse sealing system T appearing in Fig. 1 includes an intermittently functioning transverse sealer 6 which is situated in a vertical line below one of the feed rollers 3 and on whose periphery there are disposed one or more regularly spaced and heated axial bars 7 which are adapted to converge with and bear on similar, optionally unheated blocks 7' carried by a complementary part 8 suitably situated below the other feed roller 3. The transverse sealer 6 is geared to its complementary part 8 and also to a worm 9 (also through suitable media) which is relatively long and is fixed on a rotating horizontal shaft 10 which, according to the invention, is longitudinally reciprocable in bearings 11—11 forming a part of the frame F. The reciprocable shaft 10, as it will henceforth be referred to, carries and is driven by a spur gear 12 which is also relatively long and communicates with the shaft 1 through the variable speed transmission V to be subsequently described. The reasons for the unusual length of the worm 9 and spur gear 12 will also appear hereinafter.

In the operation of the mechanism thus far described, the feed rollers 3—3 draw the ribbons 4—4 from reels R—R co-incidentally welding them into the tube 4' which is advanced towards the transverse sealing system T which applies successive transverse seals 15 thereto at regular intervals in order to convert it (the tube 4') into a series of connected bags 16.

Therefrom it will be seen that the spacing between consecutive seals 15, and hence the size of the bags 16, is governed by two factors, namely; the periodicity of the transverse sealing system T and the rate at which the bag substance is fed therethrough. Thus, to vary the said spacing it is required to control the length of tube 4' which passes through the system before being acted upon thereby. In this instance the invention proposes to achieve its broad objective by regulating the periodicity of the transverse sealing system T. However, it is important to note that such uncompensated regulation would inevitably unbalance the desirable matched speed relationship of the transverse sealer 6 and the tube 4' and thus expose the bags 16 to the consequences hereinbefore stated. The invention therefore provides means for restoring the speed parity of the parts while the sealing actually takes place.

For an explanation of the method whereby this desideratum is achieved, a brief reconsideration of the structure comprising the transverse sealer 6, the worm 9, and the reciprocating shaft 10 is invited.

The rotation of the worm 9 with the reciprocable shaft 10 is obviously adapted to induce a corresponding motion in the transverse sealer 6. However, in view of its spiral cutting, the worm 9 is capable of turning the transverse sealer 6 by tangential or rectilinear pressure as well. Thus a rectilinear thrust on the reciprocable shaft 10 will either advance the rotating transverse sealer or set it back, according to the direction of the thrust, which is tantamount to the acceleration or retardation thereof.

In the intervals between consecutive transverse sealings, the elements performing this function do not contact the tube 4' and may hence be run at any speed required to achieve the desired spacing between transverse seals 15. On the other hand this speed should be readjusted to that of the travelling tube 4' while the sealing is actually in progress and this, as has been shown, can be done by shifting the reciprocable shaft 10 in the proper direction at the proper time.

The means for automatically attaining the foregoing effects include means for regulating the rotary speed of the reciprocable shaft 10 comprising the gear 12' which meshes with and drives the spur gear 12 mounted on the said reciprocable shaft 10 and which is, in turn, fixed on an intermediate shaft 17 journalled in and projecting through a wall of the frame F and carrying an exchangeable gear 18 motivated through an idler gear 19 by a driving gear 20 on the driven shaft 1; the gears 18, 19 and 20 constituting the variable speed transmission V hereinbefore noted. The idler gear 19 engaging the driving gear 20 (e. g. in 1:1 ratio) is mounted on a segment 21 which is arranged to swing about the shaft 1 and which has an arcuate slot 23 at its base accommodating a stud 24 projecting from the frame F and engaged by nut 24' whereby the segment 21 may be set in any intermediate position. More specifically, the idler gear 19 is so positioned on the segment 21 as to drive any size of exchangeable gear 18 mounted on the intermediate shaft 17; this arrangement enabling the rotary speed of the reciprocable shaft 10 and transverse sealer 6 to be varied as desired.

By means of a gear train G which includes a second spur gear 25 similar to that first described at 12, the rotatory movement of the reciprocable shaft 10 is communicated to a suitably mounted eccentric, in this case a face cam 26, with which is associated a cam follower 27 at the end of a suitably supported connecting rod 28. The contour of the face cam 26 is such as to time the longitudinal movements of the connecting rod 28 according to the application of a seal 15. That is to say, the connecting rod 28 is driven through one half of a back-and-forth cycle each time a seal 15 is being applied and concludes the other half of its cycle immediately thereafter. In the illustrated embodiment of the invention wherein the transverse sealer 6 is provided with four sealing bars to produce four transverse seals for each revolution of the shaft 10, the gear train G may and preferably will be constructed to provide a ratio of 4 to 1 so that the face cam 26 will make four revolutions for each revolution of the shaft 10 to effect reciprocation of the shaft at the proper times.

Rockably pivoted to an intermediate portion of the connecting rod 28 is the tail of a forked lever 30 whereof one branch 31 terminates in a roller 32 engaging between a pair of shaft collars 33—33 mounted on the overlying reciprocable shaft 10. The other branch 34 of the forked lever 30 is somewhat longer than its counterpart and has an axial slot 35 which is adapted to receive a fulcrum knob 36 projecting thereinto from a positionally adjustable block 37 which may be raised or lowered through known media by a handscrew 38 suitably journalled in the top of the frame F. Although in actual practice the forked lever 30 is preferably formed of two or more parts, the disclosure, for the sake of convenience, refers to it as a single element.

The effect of the lever 30 on the reciprocable shaft 10 is entirely dependent upon the vertical relation of the roller 32 to the fulcrum knob 36. For example, if they are on the same horizontal level, the rocking of the forked lever 30 will in no wise affect the reciprocable shaft 10. On the other hand, if the fulcrum knob 36 be raised or lowered in the slot 35, the reciprocable shaft 10 will be correspondingly moved by the forked lever 30; the speed of this movement being governed by the vertical separation between the roller 32 and the fulcrum knob 36. This will be readily understood if the fulcrum knob 36 be regarded as the pivot of a pendulum and the roller 32 as its peripheral terminus; the portion of the lever 30 therebetween constituting the pendulum. The frequency of the lever 30 being constant, any lengthening of the pendulum will inevitably increase the travelling speed as well as the amplitude of the roller 32 which effect will be reproduced in the reciprocable shaft 10. Conversely, a decrease in the length of the pendulum will decrease the travelling speed as well as the amplitude of the roller 32. Thus any necessary degree of thrust, whether in an accelerating or decelerating direction, can be imparted to the said reciprocable shaft 10 and, therethrough, to the transverse sealer 6, its complementary part 8, and the seal severing mechanism M to be described.

The bag size normal to the present machine may be taken to be that which would be produced if the exchangeable gear 18 on the intermediate shaft 17 were of such size as to impart to the transverse sealer 6 a basic velocity corresponding to that of the bag material acted upon thereby and if the rectilinear movement of the reciprocable shaft 10 were avoided by horizontal alignment of the roller 32 with the fulcrum knob 36. Larger bag sizes may then be obtained by increasing the diameter of the exchangeable gear 18, thus decreasing the basic speed and periodicity of the transverse sealer 6, and by raising the fulcrum knob 36 above the roller 32 to a height which would accelerate the transverse sealer 6 to the desired extent. Conversely, smaller bags 16 can be obtained by decreasing the diameter of the exchangeable gear 18, thus basically accelerating the transverse sealer 6, and by lowering the fulcrum knob 36 below the roller 32 to slow up the transverse sealer 6 at the time of its contact with the tube 4'.

It hardly need now be indicated that the extraordinary lengthening of the spur gears 12 and 25 and of the worm 9 is for the purpose of maintaining them in engagement with their co-operating gears while the reciprocable shaft 10 is in rectilinear motion.

As in the prior art, the invention also includes seal severing mechanism M for splitting the seals 15 and thus separating the connected series of bags 16 hereinbefore described and also as in the prior art, the present seal severing mechanism M is stationed below and in receiving relation to the transverse sealing system T. In previous machines capable of making bags 16 of only one size, the associated severing means was positioned at a fixed distance from the transverse sealing means. Herein, however, in view of the new facilities for fabricating bags 16 in various sizes, the severing mechanism M is required to be adjustable both in respect of timing and in distance from the transverse sealer 6.

To this end, the entire assembly is mounted on a rigid supporting panel 40 whose side edges 41—41 are chamfered and adapted to overlap the edges of a cut-out 42 in the front wall of the frame F. Correspondingly beveled slideways 43—43 are bolted about the edges of the cut-out 42 wherebetween the panel 40 may be selectively vertically slid and/or clamped. On its back, the panel 40 has a projecting boss 44 in which there is formed a screw-threaded orifice 45 designed to receive a lead screw 46 vertically journalled near the top of the frame F; means being provided for preventing inadvertent radial and axial movement of the lead screw 46. In the illustrated embodiment of the invention the means for turning the lead screw 46 is offset therefrom but is interconnected to the upper end thereof by conventional instrumentalities.

The seal severing mechanism M, per se, includes a rotary anvil support 50 fixed to a spindle 51 journalled in the panel 40 by means including a shaft strut 52, and carrying a gear 53 meshing with a spline gear 54 contained against axial movement in a fixed bracket 55 with a U-shaped cutout, and engaged on a splined shaft 56 which is slidable therethrough. The splined shaft 56 is also suitably journalled and derives its power from the transverse sealer 6 whose speed variations it consequently duplicates. Thus, irrespective of the position of the panel 40 and its associated equipment on the frame F, the anvil support 50 will continue to be operatively connected to and timed by the transverse sealer 6.

The panel 40 also carries a rotary cutter 60 which is geared to and driven by the anvil support 50 and is journalled between opposite ends of a pair of bell crank brackets 61—61 which are themselves intermediately journalled on the panel 40 by means including an outboard bearing 62. The other ends of the bell crank brackets 61 are each arranged to be caught between a pair of adjustable stops 63—63 carried in upper and lower flanges 64—64 formed on the outboard bearing 62. Recalling the intermediate journalling of the bell crank brackets 61—61, it will be seen that by properly adjusting the enumerated stops 63, the cutter 60 can be rocked towards or away from the anvil support 50. The rotary cutter 60 and anvil support 50, of course, respectively carry knives 60' and anvils 50' which are intended to converge and press against each other through transverse seals 15 whereby to split the seals 15 and thus separate the bags 16. A desirable resiliency can be imparted to this action by means of a spring 65 inserted between each bell crank 61 and one of the stops 63 therewith associated.

It will be seen that the invention partly achieves its broad objectives by dividing each cycle of the transverse sealing element 6 into two periods, namely; that intervening between two consecutive sealings, and that in which a seal is actually applied; the speed of the element during the former period being regulated to permit the passage of a predetermined length of bag material.

In its present embodiment, this inventive idea has been applied to a rotary element; this type being substantially standard in the continuous duty machines herein selected for exemplary purposes. This should, however, not be construed as a limitation since the principles above defined and hereinafter broadly claimed are equally applicable to other types of transverse sealing elements; for example, those which reciprocate.

What I claim as my invention is:

1. A bag forming machine comprising, means for continuously feeding web material at a uniform rate and forming a continuous tube therefrom, transverse sealing means comprising a sealing member orbitally movable in a path having a portion substantially coincident with the path of movement of said tube whereby said member is held in sealing engagement with said tube during a portion of its orbital movement, variable speed driving means for driving said member in timed relation to movement of said web, said driving means being adjustable to vary the time for completing an orbital cycle of said member, additional means driven by said driving means and arranged to vary the velocity of said sealing member at different points on its orbit whereby to adjust the speed of said member to substantial equality with the speed of said web over said portion of its orbital movement.

2. A bag forming machine comprising, means for continuously feeding web material at a uniform rate and forming a continuous tube therefrom, transverse sealing means comprising a sealing member orbitally movable in a path having a portion substantially coincident with the path of movement of said tube whereby said member is held in sealing engagement with said tube during a portion of its orbital movement, variable speed driving means for driving said member in timed relation to movement of said web, said driving means being adjustable to vary the time for completing an orbital cycle of said member, additional means driven by said driving means and arranged to vary the velocity of said sealing member at different points on its orbit whereby to adjust the speed of said member to substantial equality with the speed of said web over said portion of its orbital movement, orbitally movable transverse severing means having a portion of its orbital path substantially coincident with the path of movement of said web, and driving means connecting said severing means to said sealing member for synchronous orbital movement therewith.

3. A bag forming machine comprising, means for continuously feeding web material at a uniform rate and forming a continuous tube therefrom, transverse sealing means comprising a sealing member orbitally movable in a path having a portion substantially coincident with the path of movement of said tube whereby said member is held in sealing engagement with said tube during a portion of its orbital movement, variable speed driving means for driving said member in timed relation to movement of said web, said driving means being adjustable to vary the time for completing an orbital cycle of said member, additional means driven by said driving means and arranged to vary the velocity of said sealing member at different points on its orbit whereby to adjust the speed of said member to substantial equality with the speed of said web over said portion of its orbital movement, said severing means being mounted for adjustment toward and from said sealing means in a direction parallel to the direction of movement of said web therebetween.

4. A device as defined in claim 1 wherein said additional means comprises, a worm driven in rotation by said driving means and engaging a worm wheel fixed relative to said sealing member, a cam driven by said driving means, a lever swingable about a pivot and connected to said worm whereby pivotal movement of said lever causes axial movement of said worm, cam follower means engaging said cam and arranged to swing said lever about its pivot axis, and means supporting said pivot for adjustment longitudinally of said lever.

VICTOR GEORGE WILLIAMS.

REFERENCES CITED

The following references are of record in the file of this patent:

UNITED STATES PATENTS

| Number | Name | Date |
|---|---|---|
| 283,890 | House | Aug. 28, 1883 |
| 1,087,558 | Sears | Feb. 17, 1914 |
| 1,256,286 | Avery | Feb. 12, 1918 |
| 2,054,406 | Betts | Sept. 15, 1936 |
| 2,101,191 | Poppe | Dec. 7, 1937 |
| 2,237,537 | Yeates et al. | Apr. 8, 1941 |